(12) United States Patent
Huber et al.

(10) Patent No.: US 10,308,275 B2
(45) Date of Patent: Jun. 4, 2019

(54) STEERING COLUMN WITH LONGITUDINAL STOP HAVING AN ADJUSTABLE RELEASE FUNCTION IN THE EVENT OF A CRASH

(71) Applicants: ThyssenKrupp Presta AG, Eschen (LI); thyssenkrupp AG, Essen (DE)

(72) Inventors: Sebastian Huber, Göfis (AT); Mergim Murtezi, Weite (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 174 days.

(21) Appl. No.: 15/521,731

(22) PCT Filed: Sep. 22, 2015

(86) PCT No.: PCT/EP2015/071729
§ 371 (c)(1),
(2) Date: Apr. 25, 2017

(87) PCT Pub. No.: WO2016/074838
PCT Pub. Date: May 19, 2016

(65) Prior Publication Data
US 2017/0247046 A1    Aug. 31, 2017

(30) Foreign Application Priority Data
Nov. 10, 2014    (DE) .................. 10 2014 016 510

(51) Int. Cl.
*B62D 1/19*    (2006.01)
*B62D 1/184*    (2006.01)
(Continued)

(52) U.S. Cl.
CPC ............. *B62D 1/184* (2013.01); *B62D 1/185* (2013.01); *B62D 1/187* (2013.01); *B62D 1/192* (2013.01); *B62D 1/195* (2013.01)

(58) Field of Classification Search
CPC ........ B62D 1/184; B62D 1/187; B62D 1/195; B62D 1/192
(Continued)

(56) References Cited

U.S. PATENT DOCUMENTS 6,139,057 A * 10/2000 Olgren .................. B62D 1/184
280/775
6,419,269 B1 * 7/2002 Manwaring ............ B62D 1/184
280/775
(Continued)

FOREIGN PATENT DOCUMENTS

| CN | 202754011 U | 2/2013 |
| CN | 103339015 A | 10/2013 |

(Continued)

OTHER PUBLICATIONS

Int'l Search Report for PCT/EP2015/071729 dated Nov. 26, 2015 (dated Dec. 3, 2015).

*Primary Examiner* — Ruth Ilan
(74) *Attorney, Agent, or Firm* — thyssenkrupp North America, Inc.

(57) ABSTRACT

A steering column may include a casing unit with a steering spindle that is rotatable about a longitudinal axis and a bracket unit that is fixable on the motor vehicle. The casing unit may be secured to the bracket unit such that the casing unit is adjustable in at least one direction. The casing unit may be fixable in different positions by a fixing mechanism. The fixing mechanism may have a fixing element that is rotatable about a pivot axis. The casing unit may be fixed in position in or on the bracket unit in a locked position of the fixing element, and adjusted relative to the bracket unit in a (Continued)

released position of the fixing element. A movably mounted stop body may interact with the fixing element and, in the released position of the fixing element, is disposed in a first position where it limits adjustability of the casing unit relative to the bracket unit. In the locked position of the fixing element, the stop body may be disposed in a second position where it disengages with the casing unit. The stop body may include a stop face, the spacing of which from the pivot axis is greater in the released position than in the locked position.

20 Claims, 2 Drawing Sheets

(51) Int. Cl.
  *B62D 1/185* (2006.01)
  *B62D 1/187* (2006.01)
(58) Field of Classification Search
  USPC .................................. 280/775, 777; 74/493
  See application file for complete search history.

(56) References Cited

U.S. PATENT DOCUMENTS

| 7,484,430 | B2* | 2/2009 | Schulz | B62D 1/184 |
| | | | | 280/777 |
| 8,167,502 | B2 | 5/2012 | Davies | |
| 8,555,745 | B2* | 10/2013 | Inoue | B62D 1/195 |
| | | | | 280/775 |
| 8,657,338 | B2* | 2/2014 | Buzzard | B62D 1/184 |
| | | | | 280/775 |
| 8,783,717 | B2* | 7/2014 | Tinnin | B62D 1/195 |
| | | | | 280/777 |
| 8,888,131 | B2* | 11/2014 | Anspaugh | B62D 1/184 |
| | | | | 280/775 |
| 2009/0145258 | A1 | 6/2009 | Davies et al. | |
| 2010/0300236 | A1 | 12/2010 | Goulay et al. | |
| 2017/0015346 | A1* | 1/2017 | Johta | B62D 1/195 |

FOREIGN PATENT DOCUMENTS

| DE | 60315682 T | 6/2008 |
| DE | 10 2009 055 973 B | 6/2011 |
| DE | 10 2010 036 891 A | 12/2011 |
| DE | 10 2011 056 351 A1 | 6/2013 |
| EP | 2 055 612 B | 8/2011 |
| EP | 2377742 A | 10/2011 |
| EP | 2 607 203 A1 | 6/2013 |
| EP | 2 923 921 A1 | 9/2015 |
| JP | 2005 001517 A | 1/2005 |
| JP | 2009 190447 A | 8/2009 |
| JP | 2010 241321 A | 10/2010 |
| WO | 2007/058158 A | 5/2007 |

\* cited by examiner

STEERING COLUMN WITH LONGITUDINAL STOP HAVING AN ADJUSTABLE RELEASE FUNCTION IN THE EVENT OF A CRASH

CROSS REFERENCE TO RELATED APPLICATIONS

This application is a U.S. National Stage Entry of International Patent Application Serial Number PCT/EP2015/071729, filed Sep. 22, 2015, which claims priority to German Patent Application No. 10 2014 016 510.8 filed Nov. 10, 2014, the entire contents of both of which are incorporated herein by reference.

FIELD

The present disclosure generally relates to adjustable steering columns for vehicles, to stop bodies for adjustable steering columns, and to methods for adjusting steering columns.

BACKGROUND

Steering columns of the generic type are known in a multiplicity of embodiments. They are also called adjustable steering columns and allow the position of the steering wheel to be adjusted in a direction parallel to the steering spindle longitudinal axis and/or height adjustment to be performed in a direction transversely with respect to the steering spindle longitudinal axis. During driving, the casing unit is fixed in its position in the bracket unit by means of the fixing mechanism. If the fixing mechanism is moved into the released position by way of actuation of a movably mounted fixing element, the casing unit can be adjusted in at least one direction parallel and/or transversely with respect to the steering spindle longitudinal axis relative to the bracket unit which is fixed on the vehicle, and the position of the steering wheel which is attached on the steering spindle can be adjusted in this way. If the fixing unit is then moved into the locked position again, the casing unit is fixed on the bracket unit again. During normal operation, the casing unit does not move relative to the bracket unit in the locked position of the fixing element. The situation is different in the case, in which the vehicle collides with another vehicle or object. In this case, what is known as the crash case, the steering wheel which is fastened to the steering spindle is not to remain rigidly in its position, but rather is to yield in the case of an impact of the vehicle driver on the steering wheel and is to be displaced, for example, in the direction of the engine compartment. In many cases, the kinetic energy of the driver is to be absorbed during said yielding. For this purpose, it is known in steering columns of the generic type to design the fixing mechanism in such a way that it permits the displacement of the casing unit relative to the bracket unit even in the locked position of the fixing element if, in the case of a collision of the vehicle, the vehicle driver is hurled onto the steering wheel.

DE102011056351A1 discloses a steering column for a motor vehicle comprising a guide tube which can be adjusted along its longitudinal axis, two stops being provided which, upon setting of an operating lever in a first situation for adjusting the guide tube in the longitudinal direction, can collide with one another and, upon setting of the operating lever in a second situation for clamping the guide tube, cannot collide with one another. As a result of the configuration of rigid stops, however, elastic springback can occur in the completely pushed-in state of the steering column, which springback can lead to clamping of the steering column upon renewed actuating of the operating lever. The limitation of the adjusting range can also be cancelled unintentionally as a result, as a result of which the displacement travel for energy absorption is limited in an uncontrolled manner in the case of a crash.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Proceeding from the known prior art, one example object of the present disclosure is to provide a steering column with an improved stop apparatus.

Accordingly, a steering column for a motor vehicle is proposed, comprising a casing unit, in which a steering spindle is mounted such that it can be rotated about its steering spindle longitudinal axis, and a bracket unit which is fixed or can be fixed on the motor vehicle, the casing unit being held in or on the bracket unit such that it can be adjusted in at least one direction parallel and/or transversely with respect to the steering spindle longitudinal axis, and it being possible for said casing unit to be fixed by a fixing mechanism in positions which are different from one another, and the fixing mechanism having at least one fixing element which is mounted such that it can be rotated about a fixing element pivot axis, the casing unit being fixed in its position in or on the bracket unit in at least one locked position of the fixing element, and it being possible for the casing unit to be adjusted relative to the bracket unit in at least one of the directions parallel and/or transversely with respect to the steering spindle longitudinal axis in at least one released position of the fixing element, the steering column having at least one movably mounted stop body which interacts directly or indirectly with the fixing element and, in the released position of the fixing element, is arranged in a first position, in which it limits the adjustability of the casing unit relative to the bracket unit in at least one of the directions parallel and/or transversely with respect to the steering spindle longitudinal axis, and, in the locked position of the fixing element, is arranged in at least one second position, in which it is out of engagement with the casing unit. According to the invention, the stop body has a stop face, the spacing of which from the fixing element pivot axis is greater in the released position than in the locked position.

In accordance with the invention, a stop face of the stop body is used which interacts directly or indirectly with the fixing element, and the stop face is at a greater spacing from the fixing element pivot axis in the released position than in the locked position. In other words, the stop face can be displaced with respect to the fixing element pivot axis, with the result that said stop face is spaced apart more from the fixing element pivot axis in the released position than in the locked position. A displacement of the stop face of the stop body with respect to the fixing element pivot axis therefore takes place during the transfer from the locked position into the released position, with the result that the spacing between the stop face and the fixing element pivot axis is enlarged.

The enlargement of the spacing is realized by virtue of the fact that the opening movement of the fixing element, that is to say the movement from the locked position into the released position, is converted at least partially into a translational movement of the stop body, namely into a displacement with a movement component in the normal direction of the stop face. Here, the translation preferably takes place parallel to the steering spindle longitudinal axis, that is to say in the longitudinal direction of the casing unit, to be precise counter to the movement direction of the casing unit relative to the bracket unit in the case of a crash. In a correspondingly converse manner, the spacing between the stop face and the fixing element axis is converted at least partially during the closing movement of the fixing element, that is to say the movement from the released position into the locked position, into a displacement of the stop body with a movement component counter to the normal direction of the stop face, that is to say the spacing between the stop face and the fixing element pivot axis is reduced in size. Here, the conversion of a movement of the fixing element into a movement of the stop body can take place directly or indirectly.

The stop body is preferably configured in one piece. That is to say, the body is a single integral component which is not formed by way of an assembly of a plurality of components by means of joining operations. However, the stop body can also be formed from a multiple-component plastic which is preferably manufactured in an injection molding process.

It is provided here that, in the released position of the fixing element, in which the position of the casing unit relative to the bracket unit can be set, the stop body limits the adjustability of the casing unit, that is to say the possible adjusting range. In the locked position of the fixing element, that is to say in the normal operating position, in which the vehicle is also moved, it is provided in contrast that the stop body is moved into a position, in which it is not in engagement with the casing unit, that is to say is arranged out of engagement with the casing unit or releases the casing unit. This achieves a situation where, in the case of a collision, in which the fixing element is situated in the locked position, the stop body does not have any influence on the displacement of the casing unit relative to the bracket unit.

In contrast to the cited prior art, the stop face can be displaced with respect to the fixing element pivot axis, which achieves a situation where, if an elastic springback of the stop body occurs in the completely pushed-in state of the steering column, clamping of the steering column does not occur upon renewed actuating of the fixing element. Furthermore, as a result, the limiting of the adjusting range can be maintained reliably, as a result of which, in the case of a crash, the displacement travel for energy absorption is ensured and therefore the full operability can be guaranteed at all times.

Fundamentally, the fixing element can also be driven by motor, in order for it to be possible for it to be moved from the locked position into the released position and back again. Simpler and less expensive variants provide, however, that the fixing element can be actuated by hand or has a handle which can be actuated by hand. Said handle can be mounted, for example, directly or indirectly on the bracket unit such that it can be moved. The fixing element can fundamentally be mounted such that it can be displaced and/or rotated. Preferred embodiments provide that the fixing element is coupled to a lever which can be actuated by hand and can be rotated or pivoted about the fixing element pivot axis.

The casing unit of the steering column can have a very wide variety of embodiments. In the simplest embodiment, for example, the casing unit is a cylindrical tube. Furthermore, it is possible that the casing unit has an angular hollow profile or an open profile. Embodiments of this type are sufficiently well known from the prior art.

It is provided in preferred embodiments that the steering column has at least one counterstop, preferably at least two counterstops, the stop face of the stop body interacting with the counterstop, preferably with the counterstops, in the released position of the fixing element in order to limit the adjustability of the casing unit relative to the bracket unit in at least one of the directions parallel and/or transversely with respect to the steering spindle longitudinal axis. This interaction then does not become active as a rule until the stop face of the stop body comes into contact with the respective counterstop. In this case, the counterstop or the counterstops is/are then favorably arranged directly or indirectly in or on the casing unit. The counterstop is advantageously formed directly as a bulge in the casing unit, in the case where the casing unit is configured as a sheet metal molded part, preferably by means of sheet metal molding.

It is one special feature of the design according to the invention that the stop body is not introduced with its stop face, as in the prior art, only transversely into the movement path of a counterstop, but rather is moved additionally in the direction of the steering spindle longitudinal axis, that is to say parallel to the movement in the longitudinal direction of the casing unit relative to the bracket unit, which corresponds to the movement direction of the counterstop. In detail, the enlargement of the spacing between the stop face of the stop body and the fixing element pivot axis during the transfer of the fixing element out of the locked position into the released position brings about a reduction in the size of the spacing between the stop face and the counterstop. Conversely, in the case of a reduction in the size of the spacing between the stop face of the stop body and the fixing element pivot axis during the transfer of the fixing element out of the released position into the locked position, an enlargement of the spacing between the stop face and the counterstop takes place.

In order to form fixed stops in the released position, it is favorably provided that the stop body is fixed in or on the bracket unit in its position, as viewed in the direction of the adjustability of the casing unit relative to the bracket unit, and the counterstop or counterstops is/are fixed in or on the casing unit in its/their position, as viewed in the direction of the adjustability of the casing unit relative to the bracket unit. This can be achieved in a simple way by virtue of the fact that the stop body is arranged on the fixing element which is configured as a clamping bolt. Here, the stop body is fixed in the displacement direction by way of a positively locking connection on the clamping bolt.

It is to be clarified here that the stop face of the stop body or the counterstop or the counterstops has/have to be fixed or capable of being fixed only as viewed in the direction of the adjustability of the casing unit relative to the bracket unit and in the released position, in order to provide the stop function. They can certainly be mounted movably in other directions and within the context of the transfer between the released position and the locked position, as in the case of the displacement according to the invention of the stop face of the stop body with respect to the fixing element pivot axis during the transfer from the locked position into the released position, with the result that the spacing between the stop face and the fixing element pivot axis is enlarged. This can take place by way of an at least partial conversion of a rotational movement of the fixing element pivot axis into a translational movement of the stop body, for example by way of a mechanical conversion device.

In one preferred embodiment, the stop body is arranged such that it can be rotated about the fixing element pivot axis, preferably on the clamping bolt. By way of said rotational movement about the fixing element pivot axis, the stop body can be pivoted together with the fixing element to and fro between the released position and the locked position. By way of said rotation or pivoting about the fixing element pivot axis, there is therefore a possibility to bring the stop body out of engagement with the casing unit in the locked position of the fixing element.

In one preferred embodiment, the fixing element comprises a cam or a cam section, said cam or cam section interacting with a control face of the stop body. By way of the interaction of the cam or the cam section with the control face of the stop body, the enlargement of the spacing between the stop face of the stop body and the fixing element pivot axis in comparison with the spacing in the locked position takes place during the transfer into the released position. During the transfer out of the released position into the locked position, said spacing is reduced in size again. In other words, a displacement of the stop face and therefore of the stop body with respect to the fixing element pivot axis takes place by way of the interaction of the cam or the cam section with the control face, with the result that said cam or the cam section provides a corresponding stroke which brings about a change according to the invention of the spacing between the stop face and the fixing element pivot axis.

The cam or cam section is of radially eccentrically protruding configuration with regard to the fixing element pivot axis and makes contact with the control face of the stop body by way of its cam contour. In this way, a cam together with the control face forms a mechanical conversion device for converting a rotational movement of the fixing element pivot axis into a translational movement of the stop body. As a result, the stop face is displaced with a movement component in the normal direction of the stop face. An opening movement of the fixing element, that is to say the movement out of the locked position into the released position, is converted at least partially in this way into a translational movement of the stop body, namely into a displacement with a movement component in the normal direction of the stop face. The translation preferably takes place parallel to the longitudinal axis of the casing unit, to be precise counter to the movement direction of the casing unit in the case of a crash relative to the bracket unit.

In a further preferred embodiment, the stop body is coupled to a prestressing element. Said prestressing element prestresses the stop body in such a way that it can be transferred in a reliable way into the position allocated to it in the released position and in the locked position. The prestressing element is preferably under prestress both in the released position and in the locked position. During the transfer out of the released position into the locked position, the prestressing element which can also be called a spring is prestressed further, in order to reliably assist the movement of the stop body which is coupled to the prestressing element during the transfer back into the released position. Furthermore, the prestressing element serves to minimize noise which is produced during the transfer between the released position and the locked position. The spring element can preferably be configured as a leaf spring or helical spring, since said spring types have a simple construction and can be coupled easily to the stop body. Furthermore, it can be advantageous to configure the prestressing element and the stop body as a single integral component.

In one preferred embodiment, the stop body consists at least partially of a plastic. By way of the use of a plastic, the costs for the stop body can firstly be reduced, and secondly a reduction in the mass results. The entire stop body is preferably produced from a single plastic. As a result, the production costs for the stop body can be reduced further. The advantage arises, furthermore, that a certain damping action and reduction of noise is achieved when the stop face of the stop body comes into contact in order to limit the adjustment. This leads to an increase in the comfort for the vehicle driver.

In a further preferred embodiment, during the transfer, starting from the locked position, into the released position and/or the transfer, starting from the released position, into the locked position, a displacement of the stop body takes place substantially in the direction of the steering spindle longitudinal axis. According to the invention, the change in the spacing between the stop face of the stop body and the fixing element pivot axis takes place by way of the displacement of the stop body in the direction of the steering spindle longitudinal axis, with the result that said spacing is greater in the released position than in the locked position. If a counterstop is present, the stop body is preferably displaced toward said counterstop; as a result, the limiting of the adjusting range can be maintained reliably to a particular extent, as a result of which the displacement travel for energy absorption is ensured in the case of a crash.

In one preferred embodiment, the difference of the spacing in the released position and the spacing in the locked position has a value between 0.2 mm and 5 mm. By way of said value of the difference of the spacings, a sufficient displacement can be achieved in order to advantageous configure the stop according to the invention. In other words, said difference of the spacing in the released position and the spacing in the locked position is the enlargement of the spacing between the stop face of the stop body and the fixing element pivot axis between the locked position and the released position.

It has been shown in the context of tests that the difference of the spacing in the released position and the spacing in the locked position particularly advantageously is a value between 0.8 mm and 2.0 mm, since a configuration of this type requires a small amount of installation space. The value of the difference of the spacing in the released position and the spacing in the locked position is very particularly preferably between 0.5 mm and 1.0 mm.

Furthermore, the object is achieved by means of a stop body comprising a coupling section for receiving a fixing element of a steering column, and at least one stop face for interacting with a counterstop of the steering column. It is provided according to the invention that the coupling section comprises a control face for interacting with a cam section on the fixing element.

The stop body according to the invention is distinguished by the fact that a control face, as a functional element of a conversion device for converting a rotational movement of a fixing element into a translational movement according to the invention of the stop face of the stop body, is integrated into the stop body. The cam section of the fixing element makes contact tangentially by way of its eccentric cam contour with the control face on or in the coupling section, with the result that, during a rotation of the cam section, a force is exerted on the control face with a force component in the normal direction, that is to say perpendicularly. As a result the stop body can be moved in a translational manner. In this way, the camshaft together with the coupling section forms a mechanical conversion gear mechanism which converts a rotational or pivoting movement of the fixing element into a translational displacement of the stop body. The fixing element pivot axis is arranged transversely, preferably perpendicularly with respect to the steering spindle longitudinal axis, with the result that a force is exerted on the control face by the cam contour during a rotation of the cam or cam section, with the result that a displacement of the stop body takes place transversely with respect to the fixing element pivot axis parallel to the steering spindle longitudinal axis, that is to say in the direction of the longitudinal axis of the casing unit.

The control face can preferably be arranged tangentially with respect to a circumferential circle around the cam section of the fixing element. This achieves a situation where the cam or cam section exerts a force on the control face during a rotation or pivoting of the fixing element at the contact point of its cam contour, which force is directed radially outward perpendicularly with respect to the fixing element pivot axis, that is to say the rotational axis of the cam.

By virtue of the fact that the control face is oriented parallel to the fixing element pivot axis and the stop face is oriented parallel to the fixing element pivot axis, the normal directions of the control face and the stop face having a common vector component, a movement of the stop body in the normal direction of the control face leads to a movement of the stop face with at least one movement component in the normal direction of the stop face.

It is preferably provided that, in the installed state, the coupling section encloses the fixing element by way of a recess, at least partially with an intermediate space. The recess can be configured as a continuous opening or cutout which penetrates the stop body in the direction of the fixing element pivot axis. In the installed state, the cam section of the fixing element is situated in the opening, the control face which is assigned to the cam or cam section being configured tangentially on an inner face of the coupling section. Specifically, a part of the inner wall of the recess or the opening can be configured as a control face. During a rotation of the fixing element, the cam or cam section can come into contact by way of its cam contour with the control face and can exert a force on the stop body in the direction of the steering spindle longitudinal axis, which force leads to a translational movement of the stop body in said direction.

The recess or cutout is dimensioned in such a way that an intermediate space exists between the outer circumference of a fixing element which is used and the inner circumference of the recess at least in partial regions of the circumference. As a result, a play is realized which permits a translational movement of the stop body perpendicularly relative to the fixing element axis, that is to say in the direction of the steering spindle longitudinal axis. The intermediate space or the play which is formed as a result makes it possible to rotate the cam or cam section of the fixing element within the recess, the cam coming into contact by way of its cam contour which projects radially from the fixing element pivot axis with a control face on the inner circumference of the recess in a manner which is dependent on the angular position of the cams, and displacing the stop body relative to the fixing element pivot axis. Here, a cam in the released position presses against a control face in such a way that the stop body is displaced relative to the fixing element pivot axis with at least one movement component in the normal direction of the stop face, that is to say the spacing of the stop face from the fixing element pivot axis is greater than in the locked position. In the locked position, the stop body can be drawn back counter to the normal direction of the stop face, with the result that the stop face correspondingly is at a smaller spacing from the fixing element pivot axis.

In one preferred embodiment, the stop body has a first control face and a second control face, the first control face being arranged, in relation to the fixing element pivot axis, in a first circumferential region, in which the stop face is situated, and the second circumferential face being arranged in a second circumferential region which lies opposite with regard to the fixing element pivot axis. The circumferential regions which lie opposite one another can be formed by way of in each case half circumferential face regions which, as viewed from the stop face, lie on this side or on that side of the fixing element pivot axis. By way of pivoting of the cam or cam section against the first control face, out of the locked position into the released position, the latter is pressed radially outward and the stop face is moved away from the fixing element pivot axis, that is to say translationally with at least one movement component in its normal direction. If the fixing element pivot axis is then pivoted back in the counter direction, from the released position into the locked position, the or a further cam or cam section is pivoted against the second control face, with the result that the stop face is correspondingly moved counter to the normal direction of the stop face; as a consequence, the spacing between the stop face and the fixing element pivot axis is shortened. As a consequence, by way of the two control faces, a forcible movement of the stop body and therefore of the stop face can be realized in both translational movement directions in the direction of the steering spindle longitudinal axis.

One advantageous development of the invention provides that at least one control face is configured as a tangential, planar section of the inner wall of the recess. During pivoting, the cam is moved with its cam contour tangentially, at a flat angle, against the control face, as a result of which a favorable force transmission and movement profile of the stop body is achieved.

The recess preferably has at least one first inner circumferential region which is configured as a control face and one second inner circumferential region which is configured, relative to the former, at a greater spacing from the fixing element pivot axis. At least one control face with the above-described method of operation is realized in the first inner circumferential region. At least one inner circumferential region is situated adjacently with respect to a control face or between control faces, in which inner circumferential region the inner radius or cross section of the recess is dimensioned to be so great that, during a rotation of the fixing element, the cam contour does not come into contact there with the inner circumference of the recess. In other words, a circumferential region is formed which is set back radially outward with regard to the fixing element pivot axis, is passed by the cam without contact during the rotation, and on which no force is exerted by the cam as a consequence.

The recess particularly preferably has a polygonal cross section, for example a rectangular cross section. By virtue of the fact that the cam section of the fixing element is likewise of polygonal design with the same basic shape, but smaller dimensions, the edges at the corners of the polygon form cams which, during a relative rotation, make contact with the side faces of the polygonal recess and move the stop body.

All the above-described embodiments can be realized particularly favorably by virtue of the fact that the stop body is configured as a molded plastic part. Molded parts of this type can be manufactured precisely and economically from suitable plastic using the injection molding process.

In one preferred embodiment of the invention, a prestressing element is attached on the stop body. Attached is to mean both an arrangement consisting of two or more parts which are connected fixedly or releasably to form one component and a single-piece configuration. The stop body can be configured in one piece with the prestressing element. That is to say, the body is a single integral component which is not formed by way of an assembly of a plurality of components by means of joining operations. However, the stop body together with the prestressing element can also be formed in the form of a multiple-component plastic, both preferably being produced together in an injection molding process. It is also conceivable and possible, however, to configure the prestressing element as a separate component which is formed, for example, from spring steel and to connect it to the stop body by way of a joining operation or to connect said elements to one another in an injection molding process directly during the manufacture of the stop body. Said prestressing element can be configured as a spring tongue which, as viewed from the coupling section, extends to a side which lies opposite the stop face. The prestressing element ensures resilient prestress of the stop body both in the released position and in the locked position, and brings about or assists the movement of the stop piece relative to the fixing element, as has already been explained further above.

Furthermore, the invention relates to a method for adjusting a steering column for a motor vehicle, a casing unit, in which a steering spindle is mounted such that it can be rotated about its steering spindle longitudinal axis, being adjusted relative to a bracket unit which is fixed or can be fixed on the motor vehicle, the casing unit being held in or on the bracket unit such that it can be adjusted in at least one direction parallel and/or transversely with respect to the steering spindle longitudinal axis, and it being possible for said casing unit to be fixed by a fixing mechanism in positions which are different from one another, and the fixing mechanism having at least one fixing element which is mounted such that it can be rotated about a fixing element pivot axis, the casing unit being fixed in its position in or on the bracket unit in at least one locked position of the fixing element, and it being possible for the casing unit to be adjusted relative to the bracket unit in at least one of the directions parallel and/or transversely with respect to the steering spindle longitudinal axis in at least one released position of the fixing element, the steering column having at least one movably mounted stop body with a stop face, which stop body interacts directly or indirectly with the fixing element and, in the released position of the fixing element, is arranged in a first position, in which it limits the adjustability of the casing unit relative to the bracket unit in at least one of the directions parallel and/or transversely with respect to the steering spindle longitudinal axis, and, in the locked position of the fixing element, is arranged in at least one second position, in which it is out of engagement with the casing unit.

In order to solve the above-depicted problems, it is proposed for locking purposes that the stop body is moved into a loose position between the released position and the locked position, the stop face of the stop body being moved out of the released position in the direction of the steering spindle longitudinal axis in a translational manner towards the fixing element pivot axis.

In order to carry out the unlocking action during the adjustment, it is proposed that the stop body is moved into a loose position between the locked position and the released position, the stop face of the stop body being moved out of the locked position in the direction of the steering spindle longitudinal axis in a translational manner away from the fixing element pivot axis.

The special feature of the method according to the invention is that the stop body is not moved merely transversely with respect to the casing unit, as known in the prior art, or is rotated about an axis which is oriented perpendicularly with respect to the steering spindle longitudinal axis, that is to say is moved by way of pivoting of the fixing element either into the locked position which is remote from the casing unit or the released position which bears against the casing unit, but rather an additional translational movement is carried out in between along the casing unit, that is to say in the direction of the steering spindle longitudinal axis. As a result, an intermediate position of the stop body relative to the casing unit is realized, what is known as the loose position. In said loose position, the stop body still bears against the casing unit, as in the released position, but is displaced translationally with respect to the released position. As a result, the problems depicted at the outset during the adjustment of a steering column are solved, and, in particular, the safety with regard to the crash behavior is increased considerably.

Preferred exemplary embodiments will be described in the following text using the figures. Here, identical, similar or identically acting elements are denoted by identical designations. In order to avoid redundancies, a repeated description of said elements is dispensed with partially in the following description.

The invention is described using exemplary embodiments, in which the clamping action is brought about by way of a system, in which the fixing element 15, a clamping bolt in this case, is displaced in its longitudinal axis during the transition from the open into the locked position. Said displacement is achieved in the exemplary embodiments by way of a cam/cam follower system. Systems of this type are generally known and will therefore not be explained further here. As an alternative, a system can also be used, in which the axial displacement of the clamping bolt is brought about in a different way, for example by way of a system with rolling bodies which roll on corresponding tracks, or a tilt pin system. It is also conceivable and possible to apply the invention to systems, in which the actual fixing of the casing unit 1 with respect to the bracket unit 4 is brought about in a different way. It is decisive that there is the fixing element 15, with which a stop body 8 can interact in the way according to the invention.

Figure 1:
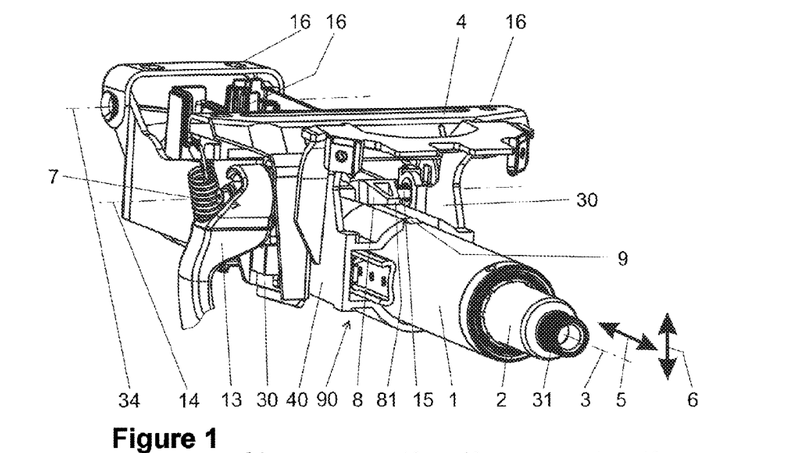
FIG. 1 is a diagrammatic perspective view of an example steering column of a motor vehicle in a locked position.

In the first exemplary embodiment according to the invention, FIG. 1 shows a perspective illustration of the steering column, the fixing element 15 being situated in the locked position, in which the casing unit 1 is fixed in its position on the bracket unit 4. This corresponds to that position of the fixing element 15 which is selected in the normal case, in order to drive the vehicle. As a consequence, the fixing element 15 is also as a rule situated in the locked position which is shown in FIG. 1 when a collision or a crash occurs during driving of the vehicle. The fixing element 15 is coupled to a stop body 8, said stop body 8 having a stop face 81. Said stop face 81 is out of engagement with the counterstop face 9 which is configured on the casing tube 1, with the result that the casing unit 1 collapses without impediment in the case of the collision or the crash. In other words, a dissipation of energy in the case of a collision is not disrupted by way of the stop body 8 and/or is not loaded with additional undesired force peaks on account of this measure.

Furthermore, FIG. 1 shows the bracket unit 4 which can be fixed by means of the fastening lugs 16 on the vehicle, and has two side cheeks 30, between which the casing unit 1 and a box section swingarm 40 of the steering column are held. As known per se, the steering spindle 2 is mounted in the casing unit 1 such that it can be rotated about the steering spindle longitudinal axis 3. In this exemplary embodiment, the fixing mechanism is based substantially on a frictionally locking connection. In the locked position of the fixing element 15 according to FIG. 1, the side cheeks 30 are pressed by the fixing mechanism against the box section swingarm 40 and this in turn is pressed onto the casing unit 1 in such a way that the latter is held fixedly in its position relative to the bracket unit 4 by means of a frictionally locking connection. This leads to the steering wheel (not shown here) which is attached at the rear end 31 of the steering spindle 2 in relation to the driving direction of the vehicle being fixed in its position. If a crash or a collision occurs in this position and the vehicle driver is hurled onto the steering wheel (not shown here), the steering spindle 2 including the casing unit 1 is displaced relative to the bracket unit 4 in such a way that the rear end 31 of the steering spindle 2 moves in the direction toward the bracket unit 4. At the beginning of said displacement of the casing unit 1 which is held in the bracket unit 4 in a clamping manner, first of all the static friction is to be overcome in the exemplary embodiment which is shown. A loading peak can be produced as a result. Subsequently, in this type of energy absorption mechanism, the energy which is introduced into the steering column by way of the loading of the steering wheel is absorbed by way of the friction which has to be overcome during the displacement of the casing unit 1 relative to the bracket unit 4 if the fixing element 15 according to FIG. 1 is situated in the locked position.

In order to not additionally load the vehicle driver who is hurled onto the steering wheel with a force or loading peak in the collision case which is depicted, the stop body 8 is arranged in the locked position of the fixing element 15 in such a way that, during the displacement, it does not pass into engagement with the casing unit 1 or a counterstop 9 on the casing unit 1.

The steering column is additionally equipped with an energy absorption mechanism 90 which, in the example, comprises two C-profiles which engage into one another and consume energy by way of friction during the displacement of the casing unit 1 with respect to the box section swingarm 40. The use of other energy absorption apparatuses, as known from the prior art, is also conceivable and possible.

Figure 2:
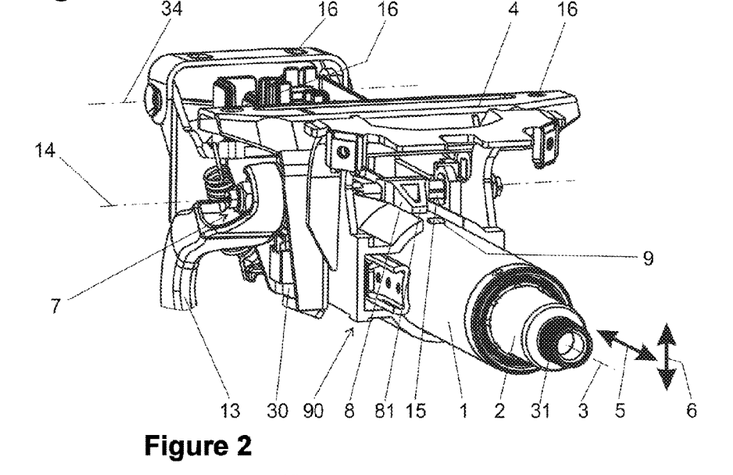
FIG. 2 is a diagrammatic perspective view of the example steering column in accordance with FIG. 1 in a released position.

FIG. 2 shows the released position of the fixing element 15 in a perspective illustration of the steering column, in which released position the casing unit 1 can be adjusted relative to the bracket unit 4. In the exemplary embodiment which is shown, both an adjustment of the casing unit 1 in the direction 5 parallel to the steering spindle longitudinal axis 3 and in the directions 6 transversely with respect to the steering spindle longitudinal axis 3 are possible in this released position of the fixing element 15. The adjusting possibility realized here transversely with respect to the steering spindle longitudinal axis 3 is a vertical adjustment. The vertical adjustment is made possible by way of a pivoting lever 13 which guides the casing unit 1 displaceably in the longitudinal direction of the steering spindle longitudinal axis 3 and is mounted such that it can be pivoted or rotated about the pivot axis 34 in the bracket unit in the height adjustment direction (=inclination adjustment). The steering column is configured so as to be adjustable in the longitudinal direction 5 and in the vertical direction 6 in this way.

In comparison to the locked position which is shown in FIG. 1, the stop body 8 is pivoted about the fixing element pivot axis 14, with the result that it lies on the casing unit 1 and, according to the invention, has an enlarged spacing between the stop face 81 and the fixing element pivot axis 14. In other words, the stop body 8 with the stop face 81 has been moved toward the counterstop 9. The stop body 8 can therefore be brought into engagement by way of its stop face 81 with the counterstop 9 when the casing unit is pushed in fully in the longitudinal adjustment direction. In interaction with the counterstop 9, the stop body 8 limits the adjustment travel in the longitudinal direction of the casing unit 1 in the released position of the fixing element.

Figure 3:
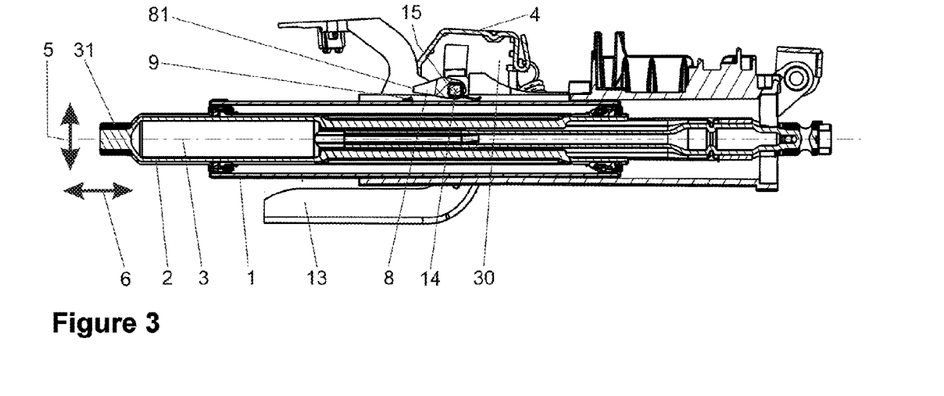
FIG. 3 is a diagrammatic sectional view of the example steering column of FIGS. 1 and 2 along a steering spindle longitudinal axis.

FIG. 3 shows a sectional illustration of the steering column from FIG. 1 along the steering spindle longitudinal axis 3. It can be seen here that the steering column is situated in the locked position, since the stop body 8 is out of engagement with the counterstop 9 of the casing unit 1, with the result that a movement of the casing unit 1 and the steering spindle 2 in the longitudinal direction is not limited by way of an interaction of the stop face 81 of the stop body 8 and the counterstop 9. With regard to the longitudinal adjustment, the casing unit 1 is situated in a state, in which it is pushed in completely in normal operation, with the result that the longitudinal adjustment range which is provided is situated at its limit.

Figure 4:
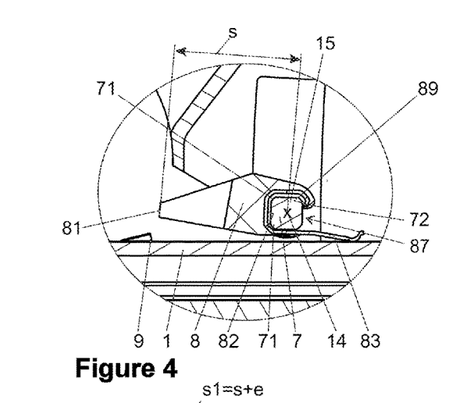
FIG. 4 is a diagrammatic detailed view of a section of an example steering column in the locked position.

FIG. 4 shows a detailed view of a sectional illustration of the steering column, the fixing element 15 or the steering column being situated in the locked position. The stop face 81 of the stop body is brought out of engagement with the counterstop 9 of the casing unit 1 by way of corresponding rotation of the stop body 8 with the fixing element 15 about the fixing element pivot axis 14. As a result, a movement of the casing unit 1 and the steering spindle 2 in the longitudinal direction is not limited by way of an interaction of the stop face 81 of the stop body 8 and the counterstop 9. The stop body 8 has a prestressing element 83, the prestressing element 83 lying on the casing unit 1 and prestressing the stop body 8 with a moment about the fixing element pivot axis 14 of the fixing element in the rotational direction of engagement.

Furthermore, the stop body 8 comprises a control face 82 which interacts with a cam section 71 on the fixing element 15. The stop face 81 is spaced apart by the spacing s from the fixing element pivot axis 14. The control face 82 is arranged in a first circumferential region of the recess 87 in relation to the fixing element pivot axis 14, on the side where the stop face 81 is situated on the stop body 8, that is to say on the left of the fixing element pivot axis 14 in the drawing.

Furthermore, the stop body 8 has a second control face 89 which interacts with a second cam section 72 of the fixing element 15. The second control face 89 is arranged in a second circumferential region which lies opposite with regard to the fixing element pivot axis (14), which second circumferential region lies opposite the first circumferential region, that is to say on the right of the fixing element pivot axis 14 in the drawing.

Figure 5:
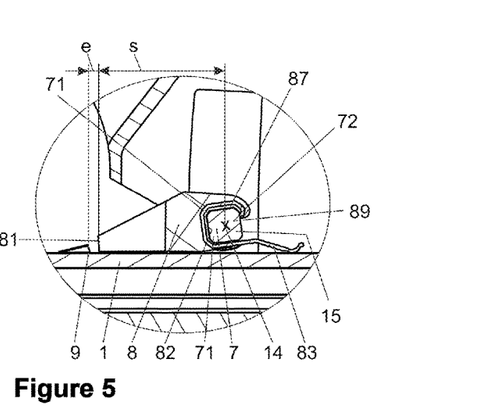
FIG. 5 is a diagrammatic detailed view of a section of an example steering column between a locked position and a released position.

FIG. 5 shows a detailed view of a sectional illustration of the steering column, the fixing element 15 or the steering column being situated in a transfer state, also called a loose position, between the locked position and the released position. In comparison to the locked position of FIG. 4, the fixing element 15 and the stop body 8 have been pivoted about the fixing element pivot axis 14 in the counterclockwise direction, the stop body 8 lying on the casing unit 1 and therefore being impeded from a further rotation about the fixing element pivot axis 14. The value of the spacing s between the fixing element pivot axis 14 and the stop face 81 of the stop body 8 is identical to spacing s, in the locked position in accordance with FIG. 4.

Figures 6, 7, 8, 9:
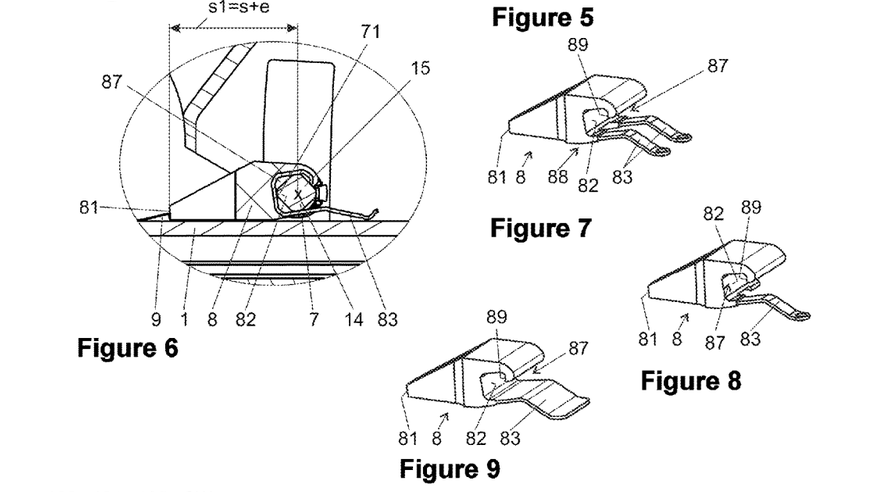
FIG. 6 is a diagrammatic detailed view of a section of an example steering column in a released position.
FIG. 7 is a diagrammatic perspective view of an example stop body.
FIG. 8 is a diagrammatic perspective view of another example stop body.
FIG. 9 is a diagrammatic perspective view of still another example stop body.

FIG. 6 shows a detailed view of a sectional illustration of the steering column, the fixing element 15 or the steering column being situated in the released position. Here, the steering column is shown in a stop position in relation to the longitudinal adjustment. In accordance with the illustration, the casing unit 1 is pushed in completely in the longitudinal direction and is therefore situated at an end of the adjustment range which is fixed by way of the interaction of the stop face 81 of the stop body 8 with the counterstop 9. In comparison with the locked position in accordance with FIG. 4 and the transfer state in accordance with FIG. 5, the fixing element 15 has been pivoted further in the counterclockwise direction. Since the stop body 8 already lay on the casing tube in the transfer state from FIG. 5 and was therefore blocked against further pivoting in the counterclockwise direction, relative pivoting of the fixing element 15 with respect to the stop body has taken place. An interaction of the cam section 71 of the fixing element 15 with the control face 82 of the stop body 8 has taken place by way of said further pivoting of the fixing element 15 about the fixing element pivot axis 14 relative to the stop body 8. By way of said interaction of the cam section 71 and the control face 82 during the relative pivoting, the spacing 51 between the stop face 81 and the fixing element pivot axis 14 increases with respect to the spacing s shown in FIG. 4 by the magnitude e in the locked position. In other words, the cam section 71 slides over the control face 82 of the stop body 8 and presses the stop body 8 and therefore also the stop face 81 away from the fixing element pivot axis 14, with the result that the stop body 8 slides over the surface of the casing unit 1 in the direction of the counterstop 9. In the released position, the casing unit 1 can then be adjusted with respect to the vehicle.

For the case where the casing unit 1 is to be fixed in the completely pushed-in position, the fixing device 7 is transferred into the locked position, starting from the illustration in accordance with FIG. 6 and, furthermore, in accordance with the illustration of FIG. 5 into the state in accordance with the illustration of FIG. 4. To this end, the fixing element 15 is pivoted in the clockwise direction. By way of the prestress by means of the prestressing element 83, a reverse rotation of the stop body 8 takes place with simultaneous shortening of the spacing 51 by the magnitude e between the fixing element pivot axis 14 and the stop face 81. Here, the second cam section is moved against the second control face 89, the stop body 8 being moved by the magnitude e in the direction toward the fixing element pivot axis 14. The casing unit 1 cannot be adjusted in said locked state of the steering column. If a renewed adjustment is to be brought about, the steering column is transferred into the released position again. As can be gathered from FIGS. 4, 5 and 6, the placing of the stop body on the counterstop is ruled out by way of the displacement according to the invention of the stop body 8. As a result, it can be prevented that the stops slip over one another, and the limiting of the adjustment can be ensured accordingly.

FIG. 5 shows the so-called loose position of the method according to the invention, in which the stop body 8 is displaced in a translational manner by the magnitude e in the direction of the steering spindle longitudinal axis 3 in comparison with the released position in accordance with FIG. 6.

Figures 10, 11, 12:
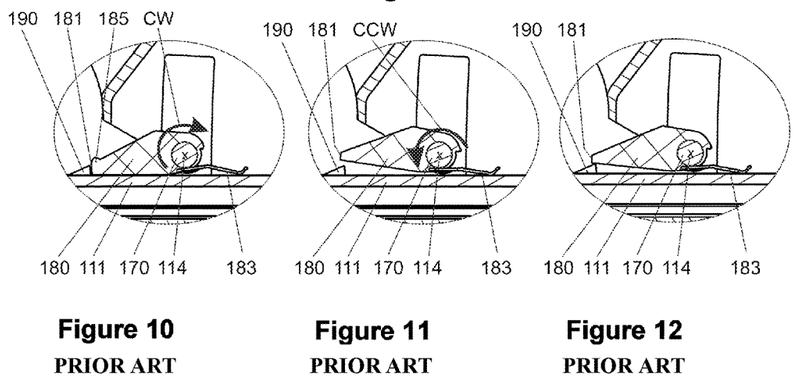
FIG. 10 is a diagrammatic detailed view of a section of a prior art steering column in a released position.
FIG. 11 is a diagrammatic detailed view of a section of the prior art steering column in the locked position.
FIG. 12 is a diagrammatic detailed view of a section of the prior art steering column after a misuse.

FIGS. 10 to 12 diagrammatically show a stop body 180 which is known from the prior art and interacts with a counterstop 190, in order to limit the adjustment of the casing unit 111. The remaining steering column has an analogous construction to the steering column which is shown in FIGS. 1 to 3.

The stop body 180 is coupled fixedly to a fixing element 170 so as to rotate with it and can be pivoted together with said fixing element 170, in order to move the stop body 180 into a first position, in which it interacts with the counterstop 190, in order to limit the adjustment of the casing unit 111 in the longitudinal adjustment direction and, furthermore, to transfer it into a second position, in which the stop body 190 is out of engagement with the counterstop 190. Here, in the released position of the fixing element 170, the stop body 180 assumes the first position, and, in the locked position of the fixing element 180, the stop body 180 correspondingly assumes the second position.

FIG. 10 diagrammatically shows the stop body 180 which is known from the prior art in one possible adjustment situation. In the illustration, the stop body 180 is situated in a first position, in which the adjustment of the casing unit 111 in the longitudinal direction is limited, the stop being reached completely. Here, the casing tube 111 with the counterstop 190 is displaced against the stop face 181 of the stop body 180, the stop body 180 being loaded under prestress by way of the action of the driver (not shown), the stop body 180 having an elastic deformation 185, that is to say being compressed elastically.

For the transfer from the released position into the locked position, the fixing element 170 together with the stop body 180 is rotated or pivoted about the fixing element pivot axis 114 in the direction CW, as shown in FIG. 11. By way of a rotation of the fixing element 170 together with the stop body 180, the steering column has been transferred into the locked position, the stop body 180 having experienced an elastic springback, after which it has been brought out of engagement with the counterstop 190. By way of the elastic springback of the stop body 180, the stop body 180 experiences a spatial expansion, that is to say the stop face 181 has moved away from the fixing element pivot axis 114, with the result that resting of the stop body 170 on the counterstop 190, as shown diagrammatically in FIG. 12, can occur during rotation of the fixing element 170 together with the stop body in the direction CCW. As a consequence, the adjustment of the casing unit 111 is no longer limited and the casing unit 111 can be adjusted beyond the adjustment travel which is customary in normal operation of the steering column, and, in said position, the steering column can be transferred into the locked position. If a collision or crash occurs in said improperly set adjustment position, the crash travel which is required for the energy absorption is no longer available, as a result of which the risk of injury to the driver rises considerably.

FIG. 7 shows a perspective illustration of the stop element 8 from FIGS. 1 to 6. Said stop element 8 comprises the stop face 81 and a coupling section 88 which has a recess 87 for receiving the fixing element 15, said recess 87 having the control face 82 for interacting with the cam section 71 of the fixing element 15. Furthermore, the stop element 8 has the two prestressing elements 83 which are configured in the form of a leaf spring. Said leaf springs are spaced apart from one another and are surrounded partially by a plastic which configures the coupling section 88 and the stop face 81, in order to achieve embedding of the prestressing elements 83. The spacing between the two prestressing elements 83 is selected in such a way that the counterstop 9 which interacts with the stop face 81 during normal operation can pass the stop element 8 without impediment in the case of a crash. Accordingly, the counterstop 9 can move between the prestressing elements 83 in the case of a collision or crash. This can ensure that no additional force peak as a result of the counterstop 9 passing occurs during the collapse of the casing unit 1 in the case of a crash.

FIG. 8 shows a perspective illustration of an alternative embodiment of the stop element 8. Said stop element 8 comprises the stop face 81 and the coupling section 88 which has a recess 87 for receiving the fixing element 15, said recess 87 having the control face 82 for interacting with the cam section 71 of the fixing element 15. Furthermore, the stop element 8 has an eccentrically arranged prestressing element 83 which is configured in the form of a leaf spring. Said leaf spring is surrounded partially by a plastic which configures the coupling section 88 and the stop face 81, in order to achieve embedding of the prestressing element 83. The prestressing element 83 is arranged in such a way that the counterstop 9 which interacts with the stop face 81 in normal operation can pass the stop element 8 without impediment in the case of a crash.

FIG. 9 shows a perspective illustration of a further alternative embodiment of the stop element 8. Said stop element 8 likewise comprises the stop face 81 and the coupling section 88 which has a recess 87 for receiving the fixing element 15. The recess 87 has the control face 82 for interacting with the cam section 71 of the fixing element 15. Furthermore, the stop element 8 comprises the prestressing element 83, the entire stop element 8 being produced integrally from plastic. The stop element 8 can advantageously be represented from a single plastic in an injection molding process. In order to represent defined prestresses and to achieve high durability, however, it can be advantageous to use a multiple-component plastic injection molding process.

If applicable, all individual features which are shown in the individual exemplary embodiments can be combined with one another and/or exchanged for one another, without departing from the scope of the invention.

What is claimed is:

1. A steering column for a motor vehicle comprising:
a casing unit in which a steering spindle is mounted such that the steering spindle is rotatable about a steering spindle longitudinal axis;
a bracket unit that is fixed or fixable on the motor vehicle, wherein the casing unit is held in or on the bracket unit such that the casing unit is adjustable in at least one direction of parallel or transverse with respect to the steering spindle longitudinal axis;
a fixing mechanism including a fixing element that is rotatably mounted about a fixing element pivot axis, with the casing unit being fixable in different positions by the fixing mechanism, wherein in a locked position of the fixing element the casing unit is fixed in position in or on the bracket unit, wherein in a released position of the fixing element the casing unit is adjustable relative to the bracket unit in the at least one direction of parallel or transverse with respect to the steering spindle longitudinal axis; and
a movably mounted stop body that interacts directly or indirectly with the fixing element, with the movably mounted stop body comprising a stop face, wherein in the released position of the fixing element the movably mounted stop body is disposed in a first position in which the movably mounted stop body limits an adjustability of the casing unit relative to the bracket unit in the at least one direction of parallel or transverse with respect to the steering spindle longitudinal axis, wherein in the locked position of the fixing element the movably mounted stop body is disposed in a second position in which the movably mounted stop body is disengaged with the casing unit, wherein a spacing of the stop face from the fixing element pivot axis is greater in the released position of the fixing element than in the locked position of the fixing element.

2. The steering column of claim 1 further comprising a counterstop, wherein the stop face of the movably mounted stop body interacts with the counterstop in the released position of the fixing element to limit the adjustability of the casing unit relative to the bracket unit in the at least one direction of parallel or transverse to the steering spindle longitudinal axis.

3. The steering column of claim 1 wherein the movably mounted stop body is rotatable about the fixing element pivot axis.

4. The steering column of claim 1 wherein the fixing element comprises a cam or a cam section that interacts with a control face of the movably mounted stop body.

5. The steering column of claim 1 wherein the movably mounted stop body either comprises or is coupled to a prestressing element.

6. The steering column of claim 1 wherein the movably mounted stop body is at least partially comprised of plastic.

7. The steering column of claim 1 wherein the movably mounted stop body is displaced in a direction of the steering spindle longitudinal axis during transfer from the locked position into the released position and/or during transfer from the released position into the locked position.

8. The steering column of claim 1 wherein a difference of the spacing of the stop face from the fixing element pivot axis in the released position and in the locked position is between 0.2 mm and 5 mm.

9. A stop body for a steering column, the stop body comprising:
a coupling section sized and shaped to receive a fixing element of a steering column, wherein the coupling section comprises a control face sized and shaped to interact with a cam section on the fixing element;
a stop face for interacting with a counterstop of the steering column,
wherein in an installed state, the coupling section encloses the fixing element by way of a recess, at least partially with an intermediate space; and
comprising a first control face and a second control face, wherein the first control face is disposed relative to a fixing element pivot axis in a first circumferential region of the recess on a side where the stop face is positioned on the stop body, wherein the second control face is disposed in a second circumferential region that lies opposite with regard to the fixing element pivot axis.

10. The stop body of claim 9 wherein the control face is disposed tangentially with respect to a circumferential circle around the cam section of the fixing element.

11. The stop body of claim 9 wherein the control face is oriented parallel to a fixing element pivot axis, wherein the stop face is oriented parallel to the fixing element pivot axis, wherein normal directions of the control face and the stop face have a common vector component.

12. The stop body of claim 9 wherein the control face is configured on an inner face of the recess of the coupling section.

13. The stop body of claim 9 wherein the control face is configured as a tangential, planar section of an inner wall of the recess.

14. The stop body of claim 9 wherein the recess comprises a first inner circumferential region that is configured as a control face and a second inner circumferential region that is disposed at a spacing that is greater from a fixing element pivot axis than is the first inner circumferential region.

15. The stop body of claim 9 wherein the recess has a polygonal cross section.

16. The stop body of claim 9 further comprising a prestressing element.

17. The stop body of claim 16 wherein the prestressing element is configured as a spring tongue, wherein from a perspective of the coupling section the spring tongue extends to a side that lies opposite the stop face.

18. A method for adjusting a steering column for a motor vehicle, the steering column comprising a casing unit in which a steering spindle is mounted such that the steering spindle is rotatable about a steering spindle longitudinal axis, a bracket unit that is fixed or fixable on the motor vehicle, wherein the casing unit is held in or on the bracket unit such that the casing unit is adjustable in at least one direction of parallel or transverse with respect to the steering spindle longitudinal axis, a fixing mechanism including a fixing element that is rotatably mounted about a fixing element pivot axis, with the casing unit being fixable in different positions by the fixing mechanism, wherein in a locked position of the fixing element the casing unit is fixed in position in or on the bracket unit, wherein in a released position of the fixing element the casing unit is adjustable relative to the bracket unit in the at least one direction of parallel or transverse with respect to the steering spindle longitudinal axis, and a movably mounted stop body that interacts directly or indirectly with the fixing element, with the movably mounted stop body comprising a stop face, wherein in the released position of the fixing element the movably mounted stop body is disposed in a first position in which the movably mounted stop body limits an adjustability of the casing unit relative to the bracket unit in the at least one direction of parallel or transverse with respect to the steering spindle longitudinal axis, wherein in the locked position of the fixing element the movably mounted stop body is disposed in a second position in which the movably mounted stop body is disengaged with the casing unit, the method comprising moving the stop body into a loose position between the locked position and the released position.

19. The method of claim 18 comprising moving the stop face of the stop body out of the released position in a direction of the steering spindle longitudinal axis in a translational manner toward the fixing element pivot axis.

20. The method of claim 18 comprising moving the stop face of the stop body out of the locked position in a direction of the steering spindle longitudinal axis in a translational manner away from the fixing element pivot axis.

* * * * *